Sept. 30, 1941.  W. H. RIGHTER ET AL  2,257,277
RADIO CONTROLLED RECOVERY MEANS FOR AIRCRAFT
Filed May 5, 1939
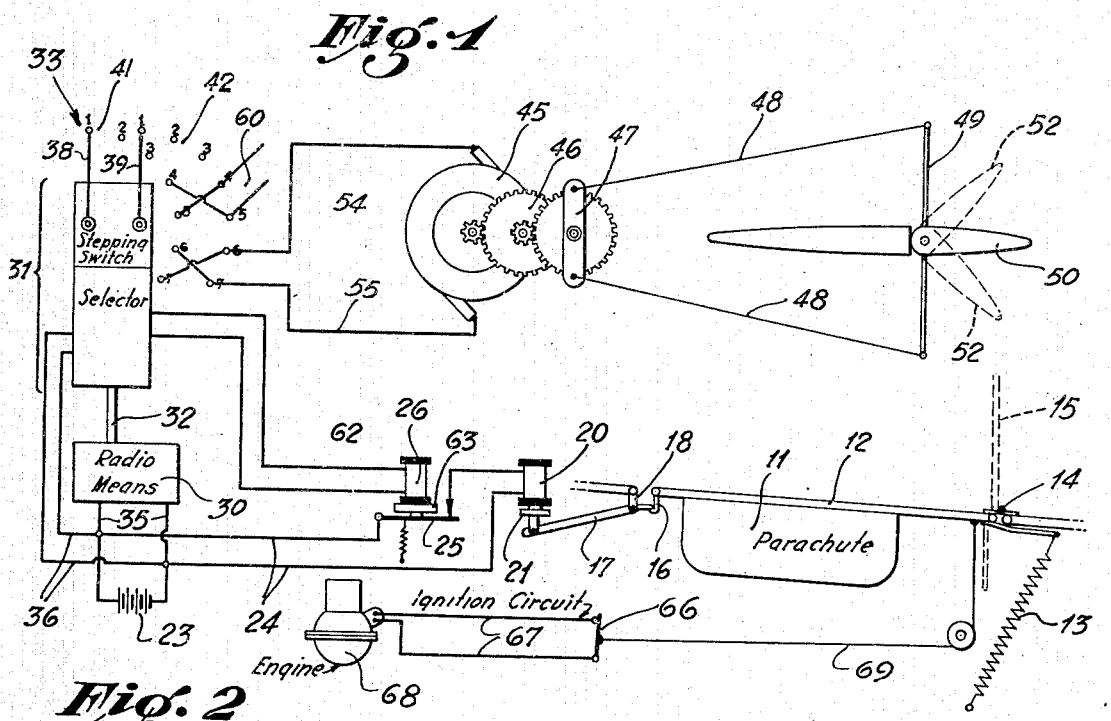
*Fig. 1*
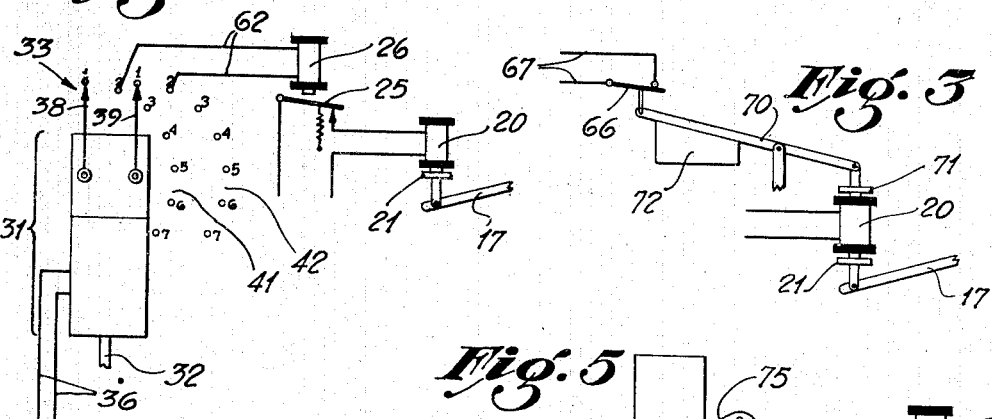
*Fig. 2*  *Fig. 3*
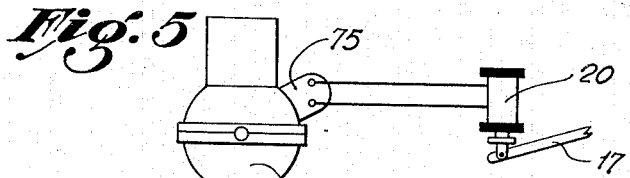
*Fig. 5*
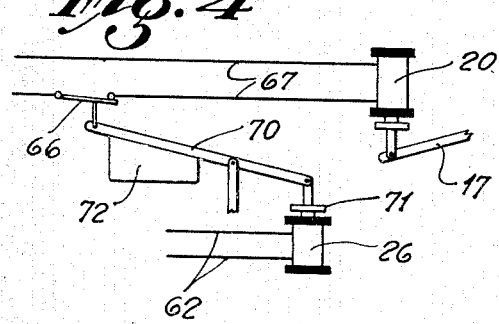
*Fig. 4*
WALTER H. RIGHTER and
KENNETH WALLACE CASE,
INVENTORS;
BY
ATTORNEY.

Patented Sept. 30, 1941

2,257,277

UNITED STATES PATENT OFFICE 2,257,277

RADIO CONTROLLED RECOVERY MEANS FOR AIRCRAFT

Walter H. Righter and Kenneth Wallace Case, Glendale, Calif., assignors to Radioplane Company, Los Angeles, Calif., a corporation of California Application May 5, 1939, Serial No. 271,920

11 Claims. (Cl. 244—1)

Our invention relates to recovery means for aircraft and has a particular utility on radio controlled airplanes. Although our invention is useful on various types of aircraft, we shall describe a form of our invention particularly adapted for use on radio controlled airplanes. It should be understood, however, that our invention may be used either in its entirety or in part, not only on radio controlled airplanes, but other aircraft, and we wish it to be understood that our invention and the protection we seek should be so construed.

Radio controlled airplanes, not having a pilot in the airplanes for flying them, are difficult to land because the controls are remotely operated from the ground through the radio transmitting and receiving mechanism.

It is an object of our invention to provide an airplane or other aircraft with a landing parachute which may be released by the radio when it is desired to land the aircraft so that the aircraft may be lowered to the ground by means of the parachute and thus have a safe landing.

It is another object of our invention to provide an aircraft having a parachute which may be released by the operator from the ground, another aircraft, or any place remote from the aircraft, and which will automatically be released when any structural or functional failure occurs. For example, if the radio transmitter fails to send out the carrier wave or modulation, if there is a failure in any of the operating mechanism in the aircraft, or if the aircraft flies out of working range of the radio apparatus, the parachute will be released and the aircraft landed thereby. In the latter mentioned situation where the aircraft flies out of the working range of the radio the result is that the aircraft is recovered by being immediately landed by the parachute rather than have the aircraft get out of control which might result not only in damage to the aircraft, but also other property or persons.

It is a further object of our invention to provide a combination in which the propelling means of the aircraft is deenergized at or about the time that the parachute is released.

It is a still further object of our invention to provide a combination in which whenever the propelling means is deenergized or is inoperative the parachute will automatically be released.

Our invention may be embodied in a number of different forms, a few of which we have illustrated in the accompanying drawing, which we will now proceed to describe in detail. It should be understood that our invention may be embodied in various forms and may be used either in its entirety or in various subcombinations. We therefore wish our invention to be broadly construed in accordance with the preceding statement of invention and the appended claims.

Referring to the drawing in detail:

Fig. 1 is a schematic or diagrammatic view showing the apparatus or mechanism located in the aircraft and embodying the features of our invention.

Fig. 2 is a fragmentary sketch of a second form of our invention.

Fig. 3 is a fragmentary sketch of a third form of our invention.

Fig. 4 is a fragmentary sketch of a fourth form of our invention.

Fig. 5 is a fragmentary sketch of a fifth form of our invention.

Referring to the drawing in detail and particularly Fig. 1, the aircraft which, for the purpose of teaching those skilled in the art as to how our invention may be practiced is an airplane as commonly employed in the airplane art at this time, is not illustrated. It will be understood, however, that all of the parts shown in Fig. 1 are mounted in or on the airplane. The numeral 11 represents a parachute which may be in a suitable container or suitably folded and supported, as is well known in the art today. This parachute is mounted on a support or door 12 which is pivoted at 14 to the fuselage or other part of the aircraft. It is preferable to have the support 12 so mounted that the parachute may be protected within the structure except when it is released, at which time the support 12 may move into a position indicated by dotted lines 15, at which time the parachute 11 becomes exposed to the exterior and will thus be released and will be unfolded and then function to safely lower the aircraft to the ground.

The support 12 is retained in a retracted or retaining position, against the action of the spring 13, by a latch mechanism which includes a hook 16 engaged by a latch arm 17 suitably pivoted at 18 to the aircraft structure. The numeral 19 represents a holding means in the form of an electromagnet 20 which when energized holds a keeper 21 which is mounted on the arm 17 in the position shown and thus retains the support 12 in the position shown in Fig. 1. It will be seen, however, that should the electromagnet 20 be deenergized the latch arm 17 will rotate in an anticlockwise direction, thus disengaging the hook 16 and allowing or causing the parachute to be released.

The electromagnet 20 is energized by a battery 23 to which it is connected by electrical circuit wires 24 which include a deenergizing switch 25. Whenever the switch 25 is closed the electromagnet 20 will be energized and the parachute held in retained position. The switch 25, however, is normally open but is held in a closed position by means of a solenoid 26, with the result that the switch 25 is retained closed only when the solenoid 26 is properly energized. This solenoid 26 is energized or operated by means of the radio apparatus in the airplane, which apparatus will now be described, and thereafter the complete operation of the apparatus will be explained.

The numeral 30 represents a radio receiving apparatus of any standard construction well known in the radio art. This radio receiver 30 functions to convert radio waves or radio energy into electrical energy. Operatively connected to the radio receiver 30 by means of a cable 32, carrying the necessary electric wires, is a selector mechanism 31 which is well known in the telephone industry and is employed wherever automatic telephone systems are in operation. Connected to and forming a part of the selector 31 is a stepping switch or minor switch 33. This switch 33 is also well known in the telephone art and is used wherever automatic telephones are in use.

In view of the fact that the radio receiver 30, the selector 31, and the stepping switch or minor switch 33 are well known in the art and may be constructed by any skilled mechanic, and more particularly because they are thoroughly described in many United States Letters Patent, the details of construction of these three elements are not described in detail. It should be understood that the invention does not reside in these particular elements but resides in a combination of which these elements may form a part.

As shown in Fig. 1, the radio receiver 30 and the selector mechanism 31 are both energized by the battery 23 through circuit wires 35 and 36, respectively. In this way energy for operating these parts is supplied.

The stepping switch 33 includes movable contacts 38 and 39, each of which has a series of stationary contacts which in this instance are numbered from 1 to 7 and are identified as 41 and 42. The stepping switch 33 may be energized to move the contacts 38 and 39 to engage any pair of contacts 1 to 7 inclusive. This mode of operation will be described in detail hereinafter. The minor switch in this form of my invention is employed to operate the controls of the airplane. For this purpose there is provided a motor 45 connected by gears 46 to an arm 47 which may be connected by cables 48 to arms 49 extending outwardly on opposite sides of a control surface 50. By rotating the motor 45 in one direction or in the opposite direction the control surface 50 may be moved into positions indicated by the dotted lines 52. This control surface 50 may be either a rudder or elevator or other control surface of the airplane. The motor 45 is in an electric circuit including conductors 54 and 55. The conductor 54 is connected to contact 6 of the series of stationary contacts 42 and contact 7 of the series of stationary contacts 41, while the conductor 55 is connected to contact 7 and contact 6 of the series of stationary contacts 41 and 42, respectively. When the stepping switch is energized so that the contacts 38 and 39 contact the stationary contacts 6 the motor will be operated in one direction, and when the movable contacts 38 and 39 contact the stationary contacts 7 the motor will be operated in the opposite direction. In this way by proper operation of the stepping switch the control surface 50 may be moved to either of the positions 52 or returned to neutral position.

The apparatus for operating the mechanism which has been described may be located on the ground, in another airplane, on a ship at sea, or at any place from which it is desired to control the operation of the aircraft. The radio transmitting apparatus or sending apparatus is of standard construction well known in the industry today and therefore need not be shown in the drawing or described in detail. This transmitting apparatus sends out a carrier wave to the radio receiver 30 and on this carrier wave is a modulation at audible frequency. This modulation is of continuous duration except that the transmitting apparatus may be operated to interrupt the modulation in order to give impulses. The radio receiver converts the radio modulation into electrical energy and the selector 31 is constantly energized except when the interruptions occur. Whenever the interruptions of the modulation take place there is a corresponding interruption in the electrical energy delivered to the selector 31, with the result that there will be electrical impulses in the selector. These electrical impulses are delivered to the stepping switch 32 and operate mechanism therein which moves the movable contacts 38 and 39 into engagement with the different stationary contacts 1 to 8, inclusive, depending upon the number of electrical impulses which are caused by the operation of the radio transmitting apparatus. It will be seen that when the proper number of impulses have been delivered to the stepping switch and move the contacts 38 and 39 into engagement with the stationary contacts 6 and 7 that at this time the circuit wires 54 and 55 will be connected in circuit with the contacts 38 and 39. Electrical energy is supplied to the contacts 38 and 39 through suitable wires included in the cable 32 which are in turn connected through suitable circuit wires including the wires 36 with the battery 23. In this way the motor 45 will be energized to rotate it either one direction or the other and thus operate the control surface 50. Other control surfaces may be connected to other of the stationary contacts, such as 4 and 5, as indicated at 60 in Fig. 1.

The solenoid 26 is connected by electrical conductors 62 to the selector 31. It is connected in such a way that the solenoid is continuously energized whenever the radio modulation is in existence, and since the solenoid 26 is continuously energized it will hold the switch 25 in closed position and thus retain the parachute within the aircraft. In view of the fact that during the normal operation of the apparatus the electrical energy supplied to the selector 31 is interrupted in order to provide electrical impulses it is necessary in the form of my invention illustrated herein to provide the solenoid with a copper slug or body 63 which provides a delayed action so that during a normal interruption the solenoid 26 will not be deenergized and thus allow the switch 25 to open. This copper slug is employed in accordance with standard practice and its action and effect are well known in the electrical art.

It will be seen from the foregoing that by the operation of the transmitting apparatus the various controls of the airplane may be operated.

It will further be seen that whenever the radio apparatus, including the sending and receiving apparatus and other interconnected mechanism in the airplane, is in proper operating condition and is functioning properly that the solenoid 26 is properly energized and the parachute retained as shown in Fig. 1. If the operator desires to land the airplane he operates the controls so as to fly the airplane over the landing field. When the airplane is over the landing field the operator then operates the radio transmitting apparatus in order to discontinue the radio modulation for such a period of time that the solenoid 26 will be completely deenergized. When this occurs the switch 25 is opened. When the switch 25 is opened the holding electromagnet 20 is deenergized and the latch arm is released. The hook 16 is disengaged and the parachute support 12 may then move to dotted line position 15 and the parachute thus released. The parachute will open and lower the plane to the ground.

In the form of our invention shown in Fig. 1 whenever any failure occurs either in the sending apparatus or the apparatus in the airplane the parachute will be automatically released. For example, if something happens to the battery 23, there will be no energy to operate the apparatus and the parachute will be released. If anything happens to any of the electrical circuits 24, 35, 36, or any of the circuits within the radio 30 or selector 31, there will be a deenergization of the holding means 20 and the parachute will be released. If any of these parts get out of adjustment so that they do not function properly, there will be a deenergization of the electromagnet 20. Likewise, if anything happens to the transmitting apparatus whereby it does not send out the carrier waves or modulation, the parachute will be released.

Since it may be desirable to deenergize the propelling means when the parachute is released, we provide a switch 66 in an ignition circuit 67 for a motor 68 of the airplane. This switch is connected by a cable 69 to the support 12 and when the support 12 is opened it pulls on the cable 69 and opens the switch 66, thus shutting off the ignition of the motor or engine 68 and thus deenergizing the propelling means. The engine 68 is representative of any propelling means which may be employed. The switch 66 is representative of any type of deenergizing means which may be employed. In place of cutting off the ignition switch there may be a means for cutting off the fuel supply.

In the form of our invention shown in Fig. 2, as well as in Figs. 3 to 5 inclusive, we have not illustrated all of the apparatus in the airplane but have illustrated only that portion which is changed from that described in Fig. 1. In these various figures the same numbers are employed to indicate similar parts. In the form of the invention shown in Fig. 2 the solenoid 26 instead of being connected to the selector 31 has its conductors 62 connected to stationary contacts 2 of the series 41 and 42. Also, the switch 25 is normally in closed position rather than in open position. When it is desired to release the parachute the operator operates the selector mechanism to give the necessary impulses to move the movable contacts 38 and 39 into engagement with the stationary contacts 2. This supplies electrical energy to the solenoid 26, thus opening the switch 25 and thus deenergizing the electromagnet 20 and releasing the parachute.

In the form of my invention shown in Fig. 3 instead of opening the ignition switch 66 through a cable and in response to the releasing of the support 12 we provide a weighted arm 70 connected to the switch 66 and retained in the position shown by means of a keeper 71 which is held downward by the electromagnet 20. When the electromagnet 20 is deenergized the weight 72 connected to the arm 70 swings the arm in an anti-clockwise direction and thus opens the switch 66.

In the form of our invention shown in Fig. 4, the switch 66 is operated as in Fig. 3 except that the keeper 71 is held downward by the solenoid 26 rather than by the electromagnet 20. The electromagnet 20 is connected in the ignition circuit 67, and when the switch 66 is opened and the ignition circuit opened the electromagnet 20 will be deenergized, thus releasing the parachute.

In the form of the invention shown in Fig. 5, the electromagnet 20 is connected to a generator or any source of energy 75 which is connected to and operated by the engine 68. When the engine 68 stops the electromagnet 20 will be deenergized, thus releasing the parachute. In this form of our invention whenever the propelling means which is represented by the engine 68 stops or fails to propel the aircraft the parachute will be released.

We claim as our invention:

1. In combination: an aircraft; a radio controlled apparatus in said aircraft for operating the controls of said aircraft; a parachute for landing said aircraft; and parachute release means operated by said radio controlled apparatus.

2. In combination: an aircraft; a radio controlled apparatus in said aircraft for operating the controls of said aircraft; a parachute for landing said aircraft; parachute release means operable to release said parachute; and operating means operated by said radio controlled apparatus for operating said parachute release means.

3. In combination: an aircraft; a radio controlled apparatus in said aircraft for operating the controls of said aircraft; a parachute for landing said aircraft; parachute release means operable to release said parachute; and operating means operated by said radio controlled apparatus in response to a structural or functional failure for operating said parachute release means.

4. In combination: an aircraft, a radio controlled apparatus in said aircraft for operating the controls of said aircraft; a parachute for landing said aircraft; parachute release means operated by said radio controlled apparatus; and means for stopping the propelling means of said aircraft when said parachute is released.

5. In combination: an aircraft; a radio controlled apparatus in said aircraft for operating the controls of said aircraft; a parachute for landing said aircraft; parachute release means operable to release said parachute; and operating means energized whenever said radio controlled means is operating properly so as to retain said parachute release means in parachute retaining position, and being operable upon deenergization to cause said parachute release means to release said parachute.

6. In combination: an aircraft; a radio controlled apparatus in said aircraft for operating the controls of said aircraft; a parachute for landing said aircraft; electrically actuated parachute release means operable to release said parachute; and operating means operated by said radio controlled apparatus for electrically releasing said parachute release means.

7. In combination: an aircraft; a radio means in said aircraft for converting radio energy into electrical energy; a parachute on said aircraft; and electrically controlled parachute release means operatively connected to said parachute so as to release the same and having operative connection with said radio means so as to receive electrical energy for its control.

8. In combination: an aircraft; a radio means in said aircraft for converting radio energy into electrical energy; a parachute on said aircraft; electrically operated parachute release means which includes holding means which when energized retains said parachute from being released; and means operated by said radio means for de-energizing said holding means.

9. In an aircraft control responsive to radio energy transmitted by radio sending means: radio receiving means on said aircraft; a parachute on said aircraft; and parachute control means on said aircraft whereby said parachute is normally retained but whereby it may be released, said control means comprising an organization of elements associated with said radio receiving means so as to be electrically energized under control of said radio receiving means, and operating in accordance with changes in the electrical energy in said organization to respectively retain and release said parachute.

10. In an aircraft, the combination of: radio means for controlling the aircraft; a parachute on the aircraft; and parachute control means by which said parachute is normally retained and whereby it may be released, said parachute control means including operative connection with said radio means whereby selective functioning of said radio means will accomplish release of said parachute, and being so arranged and connected to said radio means as to operate in response to failure of said radio means to release said parachute.

11. In combination: an aircraft; radio means to control said aircraft; propelling means for said aircraft; a parachute on said aircraft; release means for said parachute; and means forming a control connection between said release means and said propelling means, and operating in consequence of inoperation of said propelling means to actuate said release means.

WALTER H. RIGHTER.
KENNETH WALLACE CASE.